July 11, 1967 R. H. ORZABAL 3,331,043
PERMANENT HOLDING MAGNET
Filed Sept. 14, 1965
2 Sheets-Sheet 1
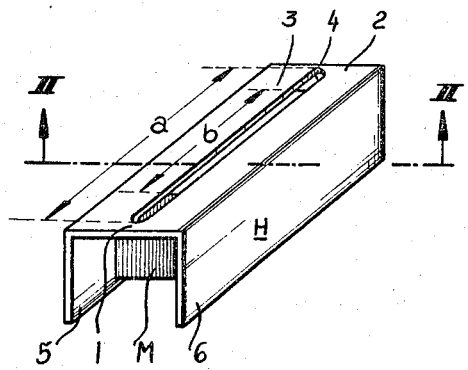
FIG.1
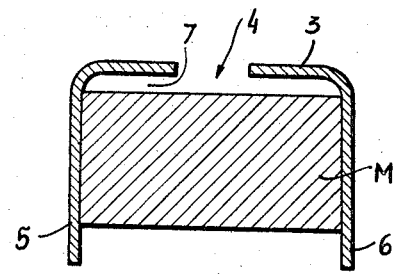
FIG.2
FIG.3
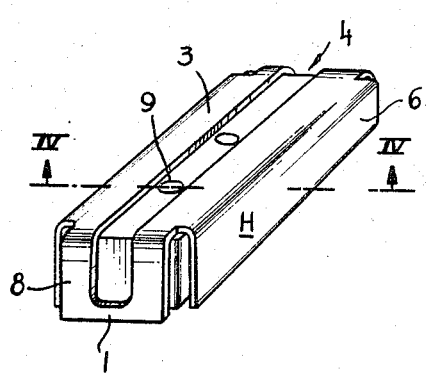
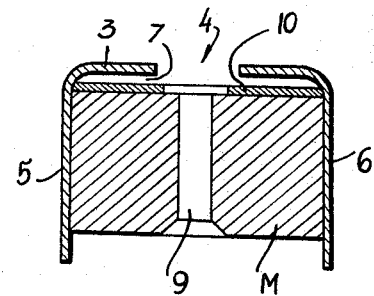
FIG.4
INVENTOR.
RAUL HECTOR ORZABAL
BY
ATTORNEYS July 11, 1967 R. H. ORZABAL 3,331,043
PERMANENT HOLDING MAGNET
Filed Sept. 14, 1965 2 Sheets-Sheet 2
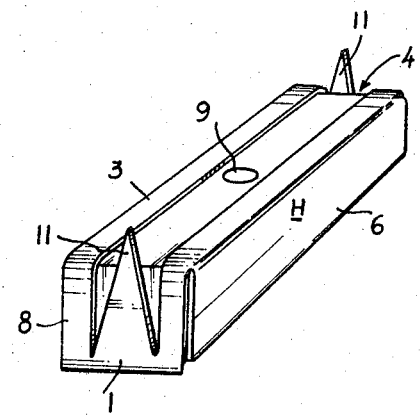
FIG. 5
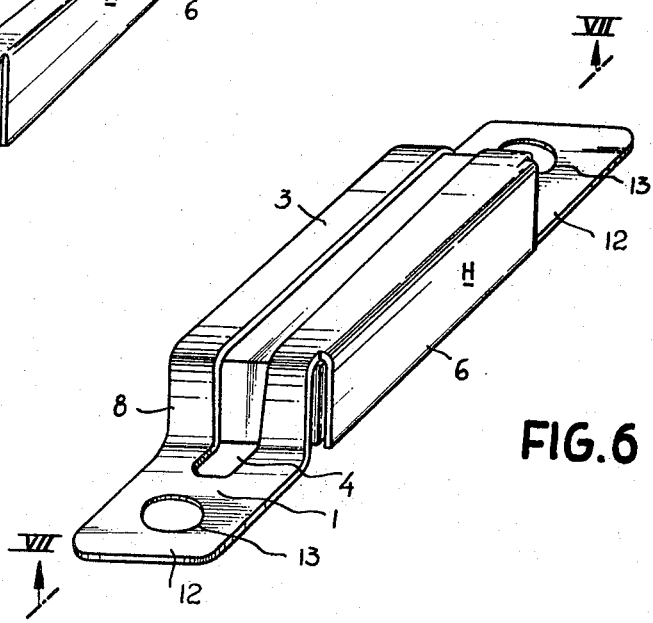
FIG. 6
FIG. 7
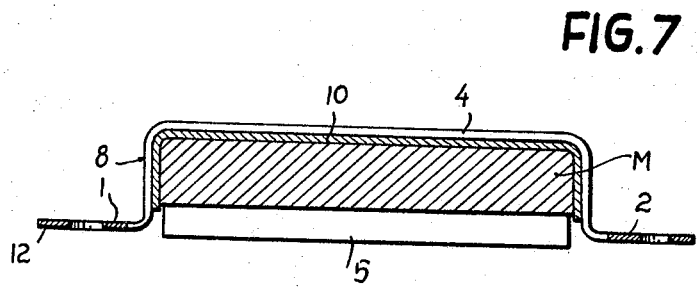
INVENTOR.
RAUL HECTOR ORZABAL

United States Patent Office 3,331,043
Patented July 11, 1967

3,331,043
PERMANENT HOLDING MAGNET
Raul Hector Orzabal, Buenos Aires, Argentina, assignor to Raul Mariano Orzabal, Buenos Aires, Argentina
Filed Sept. 14, 1965, Ser. No. 487,151
3 Claims. (Cl. 335—285)

The present invention relates to a permanent holding magnet which comprises a permanent magnet body and a poleshoe on each side or end. Permanent magnets of this type are frequently used as holding members for doors and more particularly for refrigerator cabinet doors.

Some of the known permanent holding magnets of this type are constituted by two removable L-shaped poleshoes located on and in direct slidable contact with opposite faces of the permanent magnet, the lengths of said L-shaped poleshoes being substantially equal to the length of the permanent magnet body. The position of the poleshoes on the permanent magnet body is fixed by introducing the poleshoes together with the permanent magnet body into a box of non-magnetic material wherein said poleshoes are locked.

Though the permanent holding magnets of the above type are satisfactory from an operative point of view, some difficulties are experienced during the assembly thereof and the use of a box increases the cost of these magnets.

It is an object of the present invention to provide a permanent holding magnet with poleshoes of simple construction and formed of a single member.

The improved permanent holding magnet according to the present invention comprises poleshoes which correspond to the lateral walls of a substantially U-shaped housing of magnetic material, the bottom wall of which is provided with a slot which corresponds to the air-gap between the poleshoes and extends substantially over the entire length of said housing. The permanent magnet body is arranged in the housing in direct contact with the lateral walls thereof.

In a particular embodiment of the permanent holding magnet according to the invention, the permanent magnet body is slightly separated from the bottom wall of the housing and the distance between the permanent magnet body and the bottom wall of the housing may be easily adjusted and defined by means of a strip of non-magnetic material, such as for instance, a strip of cardboard.

The best results with the abovementioned embodiment of the permanent holding magnet have been obtained when the slot in the housing is longer than the permanent magnet body. In one modification of this embodiment the slot includes a bridge member joining the poleshoes, said bridge being located substantially in the middle portion of the slot and forming an integral part of the magnetic material of the housing.

Another embodiment of the permanent holding magnet according to the invention comprises poleshoes formed by the lateral walls of an elongated open iron housing, the bottom wall of which is provided with a slot corresponding to the air-gap between the poleshoes and extending over the entire length of the bottom wall of the housing and at least over a portion of both end walls thereof, whilst the permanent magnet body is arranged in the housing in direct contact with the lateral walls but is separated from the bottom and end walls.

In another embodiment of the iron housing, the end walls thereof are provided with integral triangular lugs extending in the plane of each end wall beyond the plane of the bottom wall and substantially at right angles thereto. These triangular lugs constitute the anchoring means of the permanent holding magnet in the wooden door wherein the latter is used as closing member and the permanent magnet body is provided with at least one transversal perforation for the holding screw or any other adequate retention means.

A particularly advantageous embodiment of the permanent holding magnet according to the invention comprises poleshoes corresponding to the lateral walls of an elongated open housing of magnetic material the bottom wall of which is provided with a slot corresponding to the air-gap between the poleshoes and extending over the entire length of the bottom wall and over the end walls of the housing, a permanent magnet body being arranged in the housing in direct contact with the lateral walls and separated from the bottom wall and both end walls. Furthermore, each end wall is bent to form a fastening lug lying in a plane substantially parallel to the plane of the poleshoes.

It will be evident to those skilled in the art that the permanent holding magnet according to the invention can be easily manufactured since it is formed of only two separate components, viz. the permanent magnet body and the housing formed usually of an adequately stamped iron sheet. Thus, in the permanent holding magnet according to the present invention, the iron housing fulfills the functions of the poleshoes, that of a magnetic shunt member providing a short path for the magnetic field lines during the inoperative position of the holding magnet, and those of assembling means for the entire unit.

In order that the invention may be readily carried out, some preferred embodiments thereof will be described hereinafter with reference to the accompanying drawings in which:

FIGURE 1 is a perspective view of one embodiment of the permanent holding magnet according to the invention;

FIGURE 2 is a cross-section in the plane II—II perpendicular to the longitudinal axis of the permanent magnet body of the embodiment shown in FIGURE 1;

FIGURE 3 shows a further embodiment of the permanent magnet according to the invention;

FIGURE 4 is a cross-sectional view passing through a perforation provided in the permanent magnet shown in FIGURE 3 and perpendicular to the longitudinal axis of the magnet as indicated by line IV—IV;

FIGURE 5 is a perspective view of another embodiment of the permanent holding magnet according to the invention;

FIGURE 6 shows a perspective view of a further embodiment of the permanent magnet according to the present invention, and FIGURE 7 is a cross-sectional view of the embodiment shown in FIGURE 6 taken along a plane passing through line VII—VII and through the longitudinal axis of the permanent magnet and perpendicularly to the bottom wall of the housing.

In the figures, corresponding elements have been designated with the same reference numerals.

Referring to FIGURES 1 and 2, a rectangular permanent magnet body M is located within a U-shaped housing H formed by an adequately bent sheet of soft iron having two opposite lateral walls 5 and 6 and a bottom wall 3, which is provided with a slot 4 extending over substantially the entire length of bottom wall 3. Preferably, the length $a$ of a slot 4 is larger than the length $b$ of the permanent magnet M. Lateral walls 5 and 6 separated by slot 4 form two poleshoes for permanent magnet body M and the bridge portions 1 and 2 of bottom wall 3 constitute a magnetic shunt for permanent magnet M which is in direct contact with lateral walls 5 and 6 as can be observed in FIGURE 2 but which is separated from the inner surface of bottom wall 3 by a space 7. Space 7 can be at least partially filled by a strip of non-magnetic material for instance, a cardboard strip, operating in this instance as a positioning means for the magnet M with respect to the inner surface of bottom wall 3 during the assembly of the permanent holding magnet according to the present invention.

FIGURES 3 and 4 show another embodiment of the permanent holding magnet according to the invention in which housing H is closed at its ends by end portions 8 of bottom wall 3 bent to close the inner space of the U. In this embodiment, slot 4 extends over the entire length of bottom wall 3 and over a portion of each of end walls 8. Thus, bridge portions 1 and 2 forming the magnetic shunt for permanent magnet M, are located in end walls 8. Permanent magnet M is located in housing H and is provided with two transversal perforations 9 for screws or similar anchoring means, preferably of non-magnetic material. As can be seen in FIGURE 4, space 7 between the inner surface of bottom wall 3 and permanent magnet body M includes a strip of non-magnetic material 10, for example, a cardboard strip.

The embodiment of the permanent holding magnet according to the invention shown in FIGURE 5 is similar to that shown in FIGURES 3 and 4, but in this case, permanent magnet body M is provided with a single transversal perforation 9 located in the middle portion thereof. In order to avoid the rotation of the permanent magnet around perforation 9, end walls 8 are cut-out each to form a triangular lug 11 extending in the plane of the relevant end wall 8 beyond the plane of bottom wall 3. These triangular lugs 11 are located at the ends of slot 4 and in the central portions thereof thus forming integral parts of housing H and can be easily obtained on punching out slot 4.

FIGURES 6 and 7 show a further embodiment of the permanent holding magnet according to the invention, in which each end wall 8 is bent to form a fastening lug 12 lying in a plane substantially parallel to the plane of the borders of poleshoes 5 and 6, each lug having a hole 13 for an anchoring screw.

As can be observed in FIGURE 7, permanent magnet body M is separated from the inner surfaces of bottom wall 3 and end walls 8 by means of a cardboard strip 10.

It will be appreciated that several modifications of the disclosed embodiments of the invention are possible without departing from the spirit of the invention or the scope thereof as stated in the following claims.

I claim:
1. An improved permanent holding magnet comprising a permanent magnet body, and an integral housing of magnetically soft material disposed over said magnet body and including a bottom wall and first and second side walls forming opposite pole shoes extending outwardly from each side of said bottom wall each in direct contact with said permanent magnet body, and at least one opening in said bottom wall defining at least two wall portions bounding each end of the opening constituting saturated magnetic shunts.

2. An improved permanent holding magnet comprising a substantially block-shaped permanent magnet body and an integral housing of magnetically soft material formed by a bottom wall spaced from said magnet and first and second side walls forming respective opposite pole shoes extending outwardly from said bottom wall at each respective side thereof and in direct contact with said permanent magnet body, said bottom wall and said side walls being longer than said magnet, and at least one opening in said bottom wall at a location overlying said magnet body and defining two integral wall portions bounding each end of the opening and constituting saturated magnetic shunts.

3. An improved permanent holding magnet according to claim 2, including a lateral wall portion at each end of said bottom wall extending over the respective end faces of said permanent magnet body, the opening in said bottom wall comprising a single opening extending along said bottom wall and said lateral wall portion.

References Cited
UNITED STATES PATENTS

| | | |
|---|---|---|
| 2,506,400 | 5/1950 | Wietz. |
| 2,572,514 | 10/1951 | Phelon _____ 335—285 |
| 2,733,092 | 1/1956 | Teetor _____ 292—251.5 |
| 2,877,040 | 3/1959 | Curtiss et al. _____ 292—251.5 |

BERNARD A. GILHEANY, *Primary Examiner.*

G. HARRIS, Jr., *Assistant Examiner.*